Jan. 5, 1937.  C. W. SKEEN  2,066,805
FLEXIBLE GEAR DRIVE
Filed April 17, 1935  3 Sheets-Sheet 2

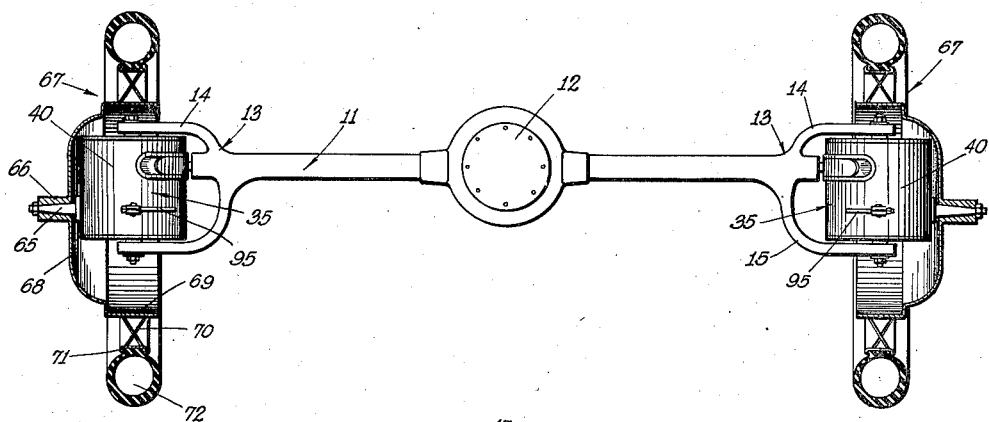
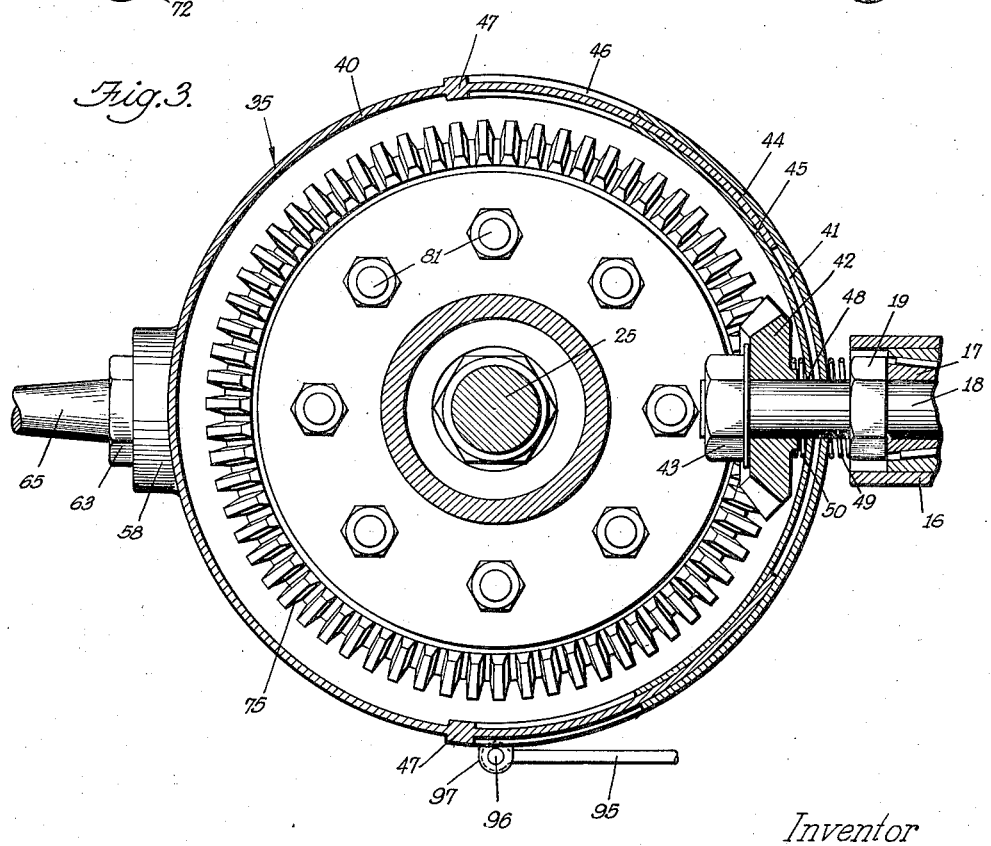

Inventor
C. W. Skeen
by Hazard and Miller
Attorneys.

Jan. 5, 1937.     C. W. SKEEN     2,066,805
FLEXIBLE GEAR DRIVE
Filed April 17, 1935     3 Sheets-Sheet 3

Inventor
C. W. Skeen
by Hazard and Miller
Attorneys.

Patented Jan. 5, 1937

2,066,805

UNITED STATES PATENT OFFICE 2,066,805

FLEXIBLE GEAR DRIVE

Chester Wallace Skeen, Mentone, Calif., assignor of seventy per cent to Frank W. Chandler and five per cent to Harold M. Price, both of Mentone, Calif.

Application April 17, 1935, Serial No. 16,779

1 Claim. (Cl. 74—385)

My invention relates to a gear drive of the so-called flexible type, in which there is used a rotating drive shaft and a rotated driven shaft, each provided with gears. My invention pertains to a type of drive in which preferably the drive shaft is maintained in a fixed location and the driven shaft may be moved bodily in an arc, but in this movement the driven shaft moves always in the same plane.

A further object and feature of my invention is in using an idler gear for transmitting the power from the gears on the driving and driven shaft. This idler rotates on a shaft which may be designated as the idler gear shaft and the driven shaft when moved bodily in an arc has the axis of the idler gear shaft as its center of bodily movement. Therefore by this construction the driven shaft may be turned bodily in a certain plane through an arc, but this arc has as its center the axis of the idler gear and therefore such axis is spaced from the driving gear. This permits transfer of power from the driving to the driven shaft in which such shafts may be in alignment or else in a plane containing the axis of the idler gear or the transmission of power may be at an angle to the plane containing both the driving shaft and the axis of the idler gear.

Another object and feature of my invention is the mounting of the gears in a housing so that they can be always subject to lubrication and this housing preferably has a slot closed by a cover through which either the driving or driven shaft may extend, it being preferable however, to have the driving shaft extend through the slot with the driving gear in the housing.

A further feature of my invention is mounting the housing with the gears which shift therewith, this including the driven shaft, in such a manner that the idler gear shaft forms the supported mounting for the rotatable housing and is used to resist twisting or torsional stresses due to the action of the gears and where the driven shaft is used to react against a thrust, the idler gear shaft resists this thrust; the thrust being first transmitted to the housing and from the housing to the idler gear shaft.

Another object and feature of my invention is the adaptation of the housing with the idler gear shaft forming the axis of rotation of the housing; this shaft also forming a mounting for the idler gear, this idler gear being driven by a gear on the driving shaft and actuating a gear on the driven shaft. Therefore by this general construction the driven shaft may be used for transmitting rotary motion such as when used in the wheel mounting of a vehicle and my construction may be adapted to a drive for a steering wheel of a vehicle. In another form of my invention the driven shaft may transmit a thrust such as in a propeller for a boat, in which case the thrust is conveyed to the housing and from the housing to the idler gear shaft.

Another object and feature of my invention is an arrangement and setup of the driving and the driven shafts, so that these will either always be in the same plane or in parallel planes, no matter in what arc the idler shaft is moved to transmit the rotational motion or the thrust at an angle to the axis of the driving shaft. With this type of construction my invention may be applied for instance to the front or steering wheel drive of a vehicle, in which case the driven shaft forms the axle of a driving and steering wheel and on account of the housing with the driven shaft being bodily movable in an arc, the vehicle may be steered by coupling the housing of two wheels where a two wheel drive is used.

Another adaptation of my invention in the propulsion of boats, on account of permitting the angular arcuate shift of the driving shaft, which shaft carries the propeller, the vessel may be given quick maneuvering characteristics in making turns in that the propeller may be shifted to have not only a thrust longitudinally of the vessel but a thrust sideways at the stern of the vessel and thus make a quick turn.

My invention is illustrated in connection with the accompanying drawings, in which, Fig. 1 is an elevation with wheels broken away, of my invention connected to an axle for driving and steering a vehicle, the housing for the gearing being shown in elevation;

Fig. 3 is a horizontal section on the line 3—3 of Fig. 2 in the direction of the arrows;

Figure 2:
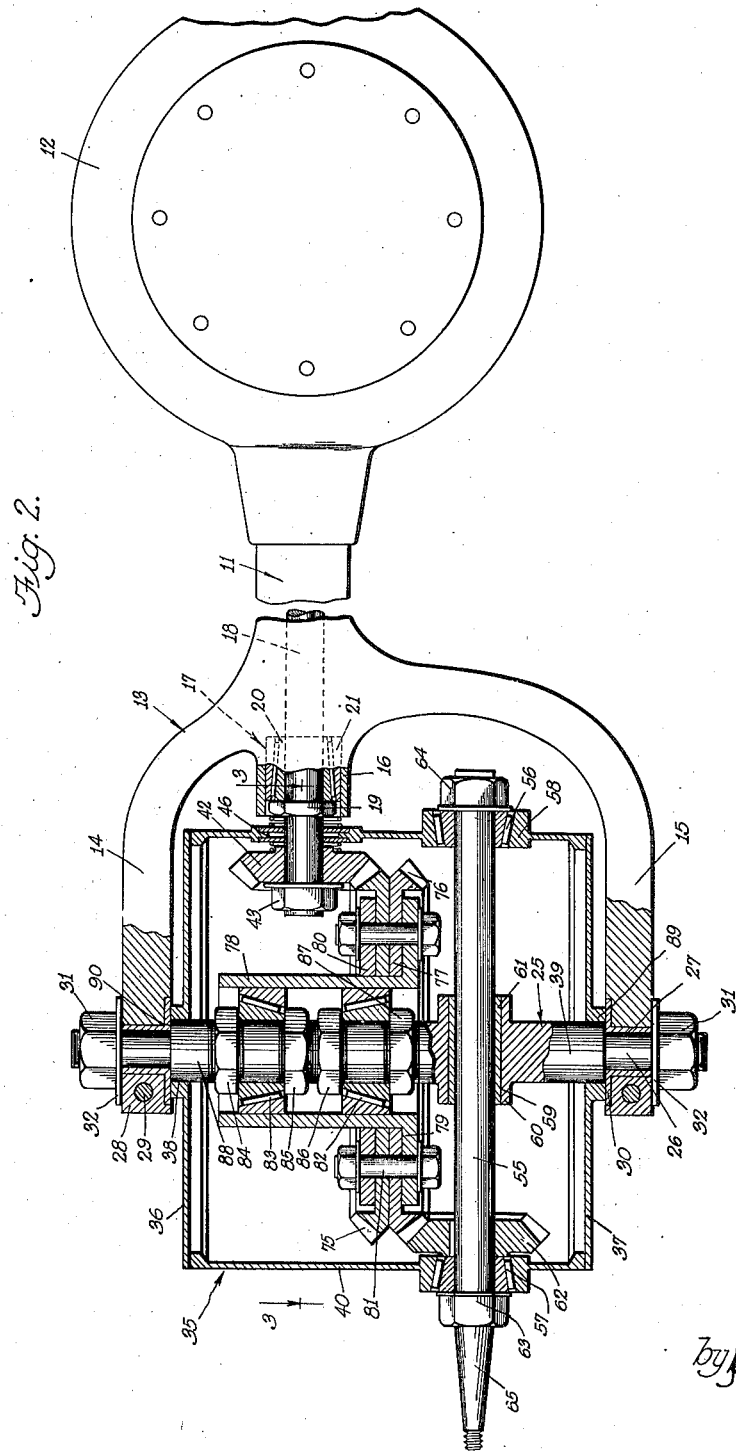
Fig. 2 is a vertical transverse section through the gear drive, showing a portion of the axle in elevation.

Referring to the construction of Figs. 1, 2 and 3, this illustrates a hollow axle housing 11 having a differential drive gear housing 12. The axle at one end is provided with a yoke 13 this having upper and lower arms 14 and 15. The outer end of each hollow axle has a bearing section 16 in which may be mounted an anti-friction bearing 17 for the drive shaft or in this case a drive axle 18. This drive axle extends through the bearing 17 which bearing is constructed to have a thrust bearing function, there being a nut 19 on the axle or shaft 18 engaging the inner race 20 of the bearing; this bearing being shown as tapered and having an outer race 21.

In my invention I employ an idler gear shaft 25 which also functions as a spindle. This is illustrated as having reduced upper and lower ends 26 operating in bushings 27, these bushings being secured in the ends of the yoke arms 14 and 15 which ends are preferably split and have a block 28 therein, the blocks being held in place by bolts 29 or the like. This gives a proper support for the bushings 27, and the bushings are illustrated as having radially extended flanges 30 fitted in the shell or recesses in the arms 14 and 15. The idler shaft 25 is held from longitudinal shift by the nuts 31 at each end which bear on the washer 32. In the construction of Figs. 1 and 2, this idler shaft rotates in the bushings of the arms 14 and 15 as hereinunder detailed.

The gear housing designated by the numeral 35 has an upper and a lower closure disk 36 and 37 each of which is provided with an opening 38 through which extends the enlarged section 39 of the idler shaft 25. A cylindrical drum 40 connects between the closure plates 36 and 37. This drum is provided with a slot 41, through this slot extends the drive shaft or drive axle 18. On the end of the axle there is a bevelled driving gear 42 held in place by a nut 43 on the end of the shaft 18. In order to provide an oiltight closure for the slot 41, I provide an arcuate outer closure plate 44 and an inner arcuate closure plate 45. These plates slide in guideways 46 forming shoulders in the wall of the drum 40. These cover plates are formed on the same circle as the drum, the center of the idler shaft 25 being the center of curvature of the drum. Curved stop shoulders 47 on both the inside and outside of the drum limit the movement of the cover plates 44 and 45. These plates each have a circular opening 48 of sufficient size to allow a rotational fit on the shaft 18. The outer plate 44 is held tightly seated against the outside of the drum by the compression spring 49 and the inside plate 45 is pressed outwardly against the inside of the drum by the compression spring 50. The spring 49 rests on the nut 19 and the spring 50 on the gear 42. If desired a suitable packing may be utilized at the plates 44 and 45 where they pass through the opening 48 in order to make a substantially grease-tight fitting.

The driven shaft 55 is mounted in anti-friction bearings 56 and 57 located on diametrically opposite sides of the drum 40, the drum having enlarged journal bosses 58 for this purpose. This driven shaft extends through a perforation 59 in the idler shaft 25, this being provided with an enlargment 60 to accommodate the shaft 55 and also the bushing 61. It is intended, however, that there be but little frictional resistance by the idler shaft 21 to the rotation of the driven shaft 55. The driven shaft has a driven bevel gear 62 thereon, located inside of the housing and secured to the drive shaft 55 preferably by a key. Nuts 63 and 64 hold the driven shaft 55 in proper relation to their bearings and thus may be used to adjust the position of the gear 62. These bearings 56 and 57 are both combinational rotation and thrust bearings and thus absorb any endwise thrust on the shaft 55. This shaft, however, is intended to mainly function in rotation and has a reduced outer end 65 forming the axle on which is mounted the hub 66 of a wheel 67. The wheel is provided preferably with a disk 68 terminating in a drum 69 on which drum there is secured spokes 70 leading to the rim 71, and to the rim there is attached a pneumatic tire 72. The drum 69 may be used as a brake drum. The central plane through the drum and through the tires is designed to be in the same plane as the axis of the idler shaft 25.

The drive is communicated from the driving gear 42 to the driven gear 62 by means of upper and lower idler gears 75 and 76. Each of these gears is connected to a disk 77, the disk being centered on a rotational sleeve 78, this sleeve having a flange 79 at its lower end and also having a flat ring 80 at the top of the nested assembly so that a series of bolts 81 may be used to attach the assembled idler gears 75 and 76 to the flange 79 of the sleeve 78. The sleeve thus rotates and operates on a pair of anti-friction bearings 82 and 83. These are coned bearings of the roller type and are in a reverse position to take up a thrust action. The anti-friction bearings are held in place by upper and lower nuts 84, 85, 86 and 87, these nuts being threaded on the enlarged upper section 88 of the idler shaft 25. By means of these nuts the bearings may be accurately adjusted; the outer race of each bearing being secured in any suitable manner to the rotating sleeve 78.

The disks 36 and 37 are each provided with a substantial shoulder collar 89 at the openings 38. The shoulders of these collars bear on the flanges 30 of the bushings 27. Thus the vertical thrust from the weight on the driven axle shaft 55 is transmitted not only by the drum 35 to the arms 15 and 16 of the yoke 13 but by means of the shouldered portions 90 of the idler shaft 25; these shoulder portions being formed between the reduced diameters 26 at the top and bottom, the lower section 39 and the upper enlarged section 88. These shoulders have a bearing on the flange 30 of the bushing 27.

The means for steering or turning the drums comprises a pair of links 95, each connected by a pivot 96 to projecting ears 97 connected to the outside of each drum. These links 95 may be actuated in any suitable manner as by a standard steering mechanism now used to rotate steering wheels on their spindles.

The manner of operation and functioning of my invention of Figs. 1, 2 and 3, is as follows:

Each of the two axle shafts 18 may be driven in an ordinary manner by a differential gear in the differential gear housing 12 and each shaft drives its own pinion gear 42. The pinion gear 42 drives the idler gear 75 which is connected to the idler gear 76 and thus communicates a drive to the driven bevel pinion 62 which as above mentioned is secured to the driven axle shaft 55. In this action the sleeve 78 is rotated on its anti-friction bearings. As above mentioned provision is made to resist any end thrust on the axle shaft 55 and the vertical thrust due to the load on the wheels is in part taken up by the end bearings 56 and 57 in the journal bosses 58 of the drum and in part by the bearing in the idler shaft 25. This construction of having the drive shaft 18 offset above the driven shaft 55 provides for sufficient road clearance below the axle housing 11 and the differential housing 12.

When the drums are rotated by means of the links 95 the whole drum and also the idler shaft 25 is similarly rotated. This moves the driven axle shafts 55 in a plane, this being substantially a horizontal plane where the idler shaft 25 is arranged vertically. Thus the wheels of the vehicle may be shifted to make a turn and at the same time maintain a driving action due to the continuous drive between the driving gear 42 and the driven gear 62.

With my type of gear drive there is no cramping action in the driving force, no matter how sharp a turn is made by the road wheels, as the driving force is not affected by the turning of the drum 35, except that at the moment in which the combined gears 75 and 76 are turned with the drum in reference to the gear 42, but this will be the same as to both wheels so that they will both have the same relative drive. Therefore both wheels will have the same rotational torque delivered to each and hence the steering will only be affected by the turn given to the drums.

Figure 4:
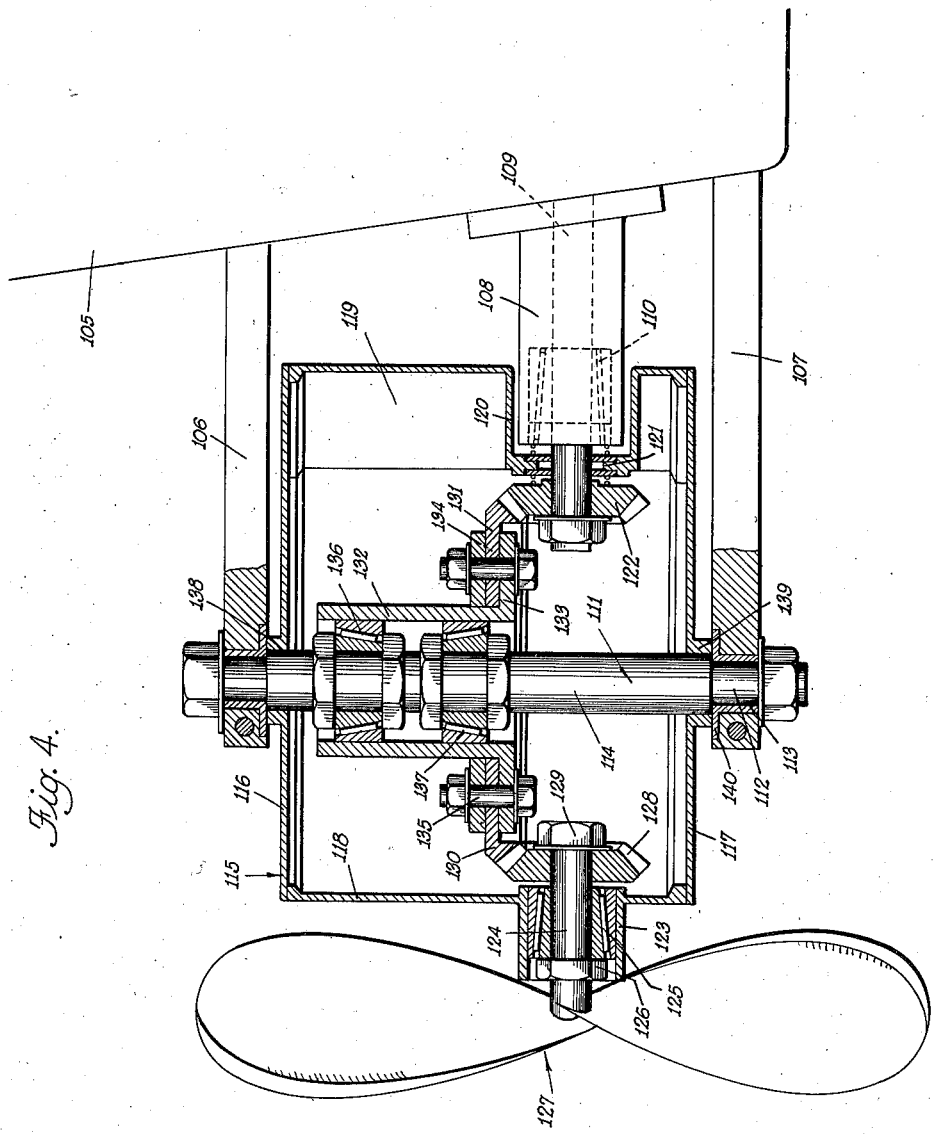
Fig. 4 is a vertical longitudinal section showing a modified construction of my invention adapted for a propeller drive of a vessel.

In the construction of Fig. 4 I show a setup of my invention adapted for the propulsion of a vessel, in which a portion of the vessel is indicated by the numeral 105 having upper and lower substantial arms 106 and 107 connected thereto. A drive shaft casing 108 is connected to the stern of the vessel and through this operates the drive shaft 109, this operating in anti-friction bearings 110 in the casing. This anti-friction bearing may be mounted as shown in Fig. 2.

An idler gear shaft 111 has reduced ends 112 with bushings 113 and is mounted in the arms 106 and 107 in a manner illustrated and described in connection with Fig. 2, except in this case the idler gear shaft may be clamped tight to prevent its rotation. The idler shaft has an enlarged section 114.

The gear housing 115 has upper and lower closure disk plates 116 and 117 connected to the wall of the drum 118. This is preferably cylindrical except for a nose structure 119 at the front giving a somewhat stream lined effect. This nose has a recess 120 leading to the slot 121 through which the driving shaft 109 extends. This shaft has a driving bevel gear 122 mounted thereon. The slot is closed by inner and outer cover plates of the same type and character as described in connection with Figs. 2 and 3. The drum section of the housing is provided with a tube 123 directly opposite the center of the slot 121 and through this tube extends the driven shaft 124, this being mounted in anti-friction bearings 125 held in place by a nut 126. This bearing is designed to take care of the rotational stresses and also the thrust of a propeller 127 mounted on the outer end of the driven shaft 124. This driven shaft has a driven bevel gear 128 mounted on its inner end and held in place by a nut 129.

The idler gear 130 is of a bevel type and has formed integral therewith a ring 131. A rotating sleeve 132 has a flange 133 at its lower end to which the ring 131 is clamped, there being utilized an upper ring 134 and clamping bolts 135 through the flange 133, the ring 131 of the gear and the ring 134, thus firmly securing the idler gear to the sleeve 132. This sleeve is mounted in upper and lower anti-friction bearings 136 and 137, these being mounted on the enlarged section 114 of the idler gear shaft 111. These bearings are designed to take care of rotational and thrust stresses and may be of the same type and character as shown in connection with Figs. 2 and 3.

Each of the plates 116 and 117 is provided with an opening 138. Each opening is surrounded by an abutment shoulder structure 139 which bears on the flange 140 of the bushing 113. The housing has a link attached thereto similar to the link 95 of Fig. 3, or a similar construction by which the housing with the driven shaft may be turned bodily on the idler gear shaft 111. By this construction this idler gear shaft 111 is preferably mounted vertical and by having a single idler gear 130 the driving shaft 109 and the driven shaft 124 may be in the same horizontal plane. When the vessel is being driven in a forward direction, the shafts 109 and 124 will be maintained in alignment so that there is a direct forward thrust by the propeller. This thrust is communicated from the driven shaft 124 through the medium of its bearing 125 to the housing 118 and from this housing to the fixed idler gear shaft 111 which as above mentioned is firmly clamped in the arms 106 and 107. As the housing containing the gears may be rotated on the idler gear shaft 111, the driven shaft 124 may be turned at an angle to the vertical plane through the center of the vessel and the idler gear shaft 111. This will cause a side thrust to be developed on the arms 106 and 107 and hence on the stern of the vessel and enable the vessel to make a quick turn. With my invention I may use an ordinary rudder preferably located aft the propeller and the rudder may be used for ordinary turning of the vessel unless a quick turn is desired, but when the propeller is shifted to one side to give a lateral thrust and at the same time the rudder is deflected to give the same turn through the reaction of the water driven rearwardly by the propeller, the rudder increases the turning force and thus gives an increased quickness in making maneuver turns for the vessel.

Various changes may be made in the details of construction without departing from the spirit or scope of the invention as defined by the appended claim.

I claim:

A gear drive comprising in combination a supporting structure having an idler gear shaft mounted therein, anti-friction combination thrust and rotational bearings having inner and outer ball races connected to the shaft, a sleeve engaging the outer races and having a flange and idler gear on the flange, a housing structure having a slot on one side, a driving shaft extending through the slot and having a driving gear meshing with the idler gear, a driven shaft journaled in the housing and having a driven gear meshing with the idler gear, and means to rotate the housing relative to the driving shaft, the driving shaft being mounted in a journal in the supporting structure, there being guides adjacent said slot, cover plates slidably mounted on said guides and having openings for the passage of the driving shaft, and springs bearing against means engaging the journal of the driving shaft and one of the plates and against the driving gear and one of the plates to form a greaseproof closure for said slot.

CHESTER WALLACE SKEEN.